United States Patent
Richards

(10) Patent No.: US 9,656,330 B2
(45) Date of Patent: May 23, 2017

(54) MACHINING SYSTEM

(71) Applicant: James L. Richards, Broomfield, CO (US)

(72) Inventor: James L. Richards, Broomfield, CO (US)

( * ) Notice: Subject to any disclaimer, the term of this patent is extended or adjusted under 35 U.S.C. 154(b) by 67 days.

(21) Appl. No.: 14/776,638

(22) PCT Filed: Mar. 18, 2014

(86) PCT No.: PCT/US2014/031117
§ 371 (c)(1),
(2) Date: Sep. 14, 2015

(87) PCT Pub. No.: WO2014/153364
PCT Pub. Date: Sep. 25, 2014

(65) Prior Publication Data
US 2016/0023283 A1 Jan. 28, 2016

Related U.S. Application Data

(60) Provisional application No. 61/802,569, filed on Mar. 16, 2013.

(51) Int. Cl.
*B23C 3/12* (2006.01)
*B23B 31/08* (2006.01)

(52) U.S. Cl.
CPC ............... *B23C 3/12* (2013.01); *B23B 31/08* (2013.01); *B23B 2220/08* (2013.01); *B23C 2220/20* (2013.01); *Y10T 409/308512* (2015.01)

(58) Field of Classification Search
CPC . Y10T 409/307672; Y10T 409/308512; Y10T 409/308232; B23C 1/12; B23C 3/12; B23C 2220/20; B23Q 3/18
See application file for complete search history.

(56) References Cited

U.S. PATENT DOCUMENTS 2,823,591 A * 2/1958 Craddock ............ B23Q 1/5456
409/190
4,411,568 A 10/1983 Rohm
(Continued)

FOREIGN PATENT DOCUMENTS

DE 3432773 A1 * 1/1985 ............... B23C 3/12
DE 3743091 A1 * 8/1988 ............. B23B 31/08
(Continued)

OTHER PUBLICATIONS

International Search Report dated Aug. 18, 2014—PCT/US2014/031117—Mar. 18, 2014.
U.S. Appl. No. 12/549,138—prior art.

*Primary Examiner* — Daniel Howell
(74) *Attorney, Agent, or Firm* — Karish & Bjorgum, PC

(57) ABSTRACT

A machining system includes a tool head having a yoke, a housing pivotally mounted to the yoke and a collet rotatable in the housing. The collet includes a tool head rocker driven by fluid to allow rocking of a tool relative to the collet in a plane normal to the housing pivotal axis in the yoke. The machining system also includes a source of constant liquid pressure and a source of constant gas pressure. The collet has pressure chambers in communication with the sources of constant pressures to bias the rockable collet assembly. The collet/tool axis is arranged to trail in the direction of relative motion when the contour of the work is moving away from the tool head and to lead when the contour of the work is approaching the tool head.

4 Claims, 7 Drawing Sheets

(56) References Cited

U.S. PATENT DOCUMENTS

| | | | |
|---|---|---|---|
| 4,558,506 A | 12/1985 | Kielma | |
| 4,704,056 A | 11/1987 | Babel | |
| 5,208,958 A | 5/1993 | Wilcox | |
| 5,238,340 A * | 8/1993 | Ochiai | B23Q 11/0028 409/201 |
| 6,428,253 B1 * | 8/2002 | Kochsiek | B23B 29/03457 408/147 |
| 7,137,763 B2 * | 11/2006 | Lawson | B23B 31/08 408/127 |
| 7,475,613 B2 * | 1/2009 | Bailey | B23Q 1/5412 248/181.1 |
| 7,857,558 B2 * | 12/2010 | Schrott | B23C 1/12 409/201 |
| 2001/0046422 A1 * | 11/2001 | Colombo | B23Q 1/5406 409/201 |

FOREIGN PATENT DOCUMENTS

| | | | | |
|---|---|---|---|---|
| DE | 3710688 A1 * | 10/1988 | | B23C 1/20 |
| DE | 3738619 A1 * | 6/1989 | | B23C 3/12 |
| DE | 3932089 A1 * | 5/1990 | | B23D 79/02 |
| DE | 19850603 A1 * | 5/2000 | | |
| FR | 2926740 A1 * | 7/2009 | | |
| GB | 1408171 A | 10/1975 | | |

\* cited by examiner

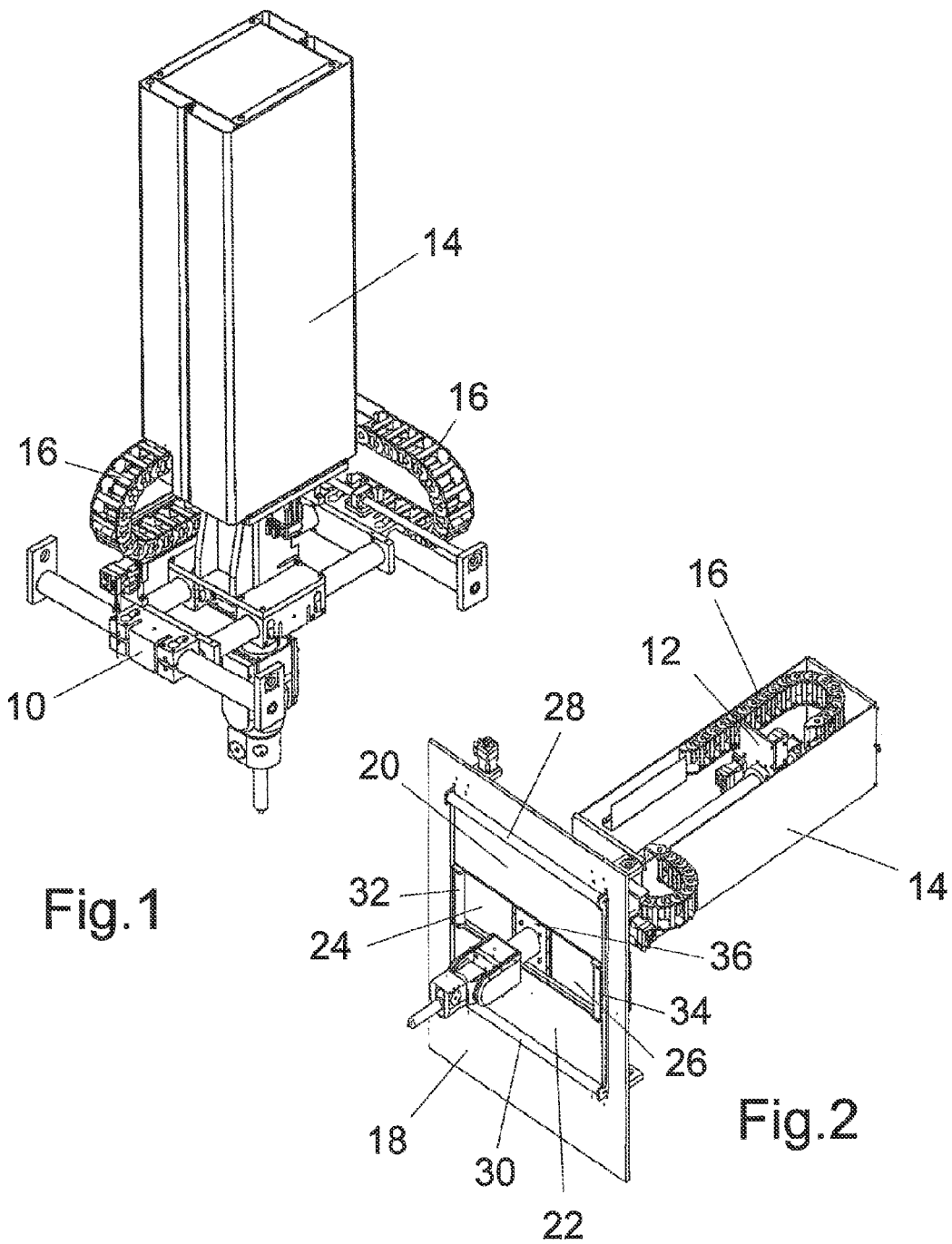

MACHINING SYSTEM

RELATED APPLICATION

Applicant claims priority from U.S. Provisional Application Ser. No. 61/802,569, filed Mar. 16, 2013, the disclosure of which is incorporated herein by reference.

BACKGROUND OF THE INVENTION

The field of the present invention is machines for deburring machined parts and for other machining tasks controlled by automation control.

Deburring machines are well known in the machining industry for removing sharp burrs and/or producing chamfers and the like remaining after the machining process. Such machines may also be used for parts formed through casting and other techniques which need cleaning of surfaces and/or edge machining. Such devices typically include deburring heads mounted to mounts including orthogonal mounts which allow positioning of the deburring heads to address work on work supporting spindles. More than one deburring head is often included in a given system. The heads themselves are typically adjustable for exacting placement and motion.

A deburring machine from which the present embodiment has evolved is illustrated and disclosed in U.S. patent application Ser. No. 12/549,138, filed Aug. 27, 2009, the disclosure of which is incorporated in its entirety herein by reference. In this prior disclosure, a deburring machine is illustrated which includes a housing with a chamber which is open upwardly. A conventional work supporting spindle is located on the floor of the chamber. An orthogonal mounting fixed atop the housing is made up of conventional components to define two degrees of freedom in a horizontal plane. Two deburing heads are shown supported by the orthogonal mounting. The two deburring heads are further mounted on the orthogonal mounting by vertically translating mounts to provide a third degree of freedom to the deburring heads which extend into the chamber.

SUMMARY OF THE INVENTION

The present invention is directed to a machining system having a tool head with a collet assembly in a gimbaled mount receiving a tool. The collet assembly provides a further degree of freedom to a mounted tool to rock in the mount toward and away from the work. This rocking is biased by constant fluid pressure toward the work. A chamber or chambers communicate the pressure force to the tool. The fluid pressure may be compressible, incompressible or both.

The machining system may be driven such that the collet/tool rotational axis trails the tool head in relative motion of the head across the work when the contour of the work is receding from the head. The collet/tool rotational axis leads the tool head in relative motion of the head across the work when the contour of the work is advancing toward the head.

Therefore, it is a principal object of the present invention to provide a machining system with an improved drive system and tool head for automated machining processes such as deburring having an advantaged accommodation of work anomalies. Other and further objects and advantages will appear hereinafter,

BRIEF DESCRIPTION OF THE DRAWINGS

FIG. 1 is a perspective view of a deburring system.

FIG. 2 is an upward perspective view of the deburring system.

DETAILED DESCRIPTION OF THE PREFERRED EMBODIMENT

Figure 3:
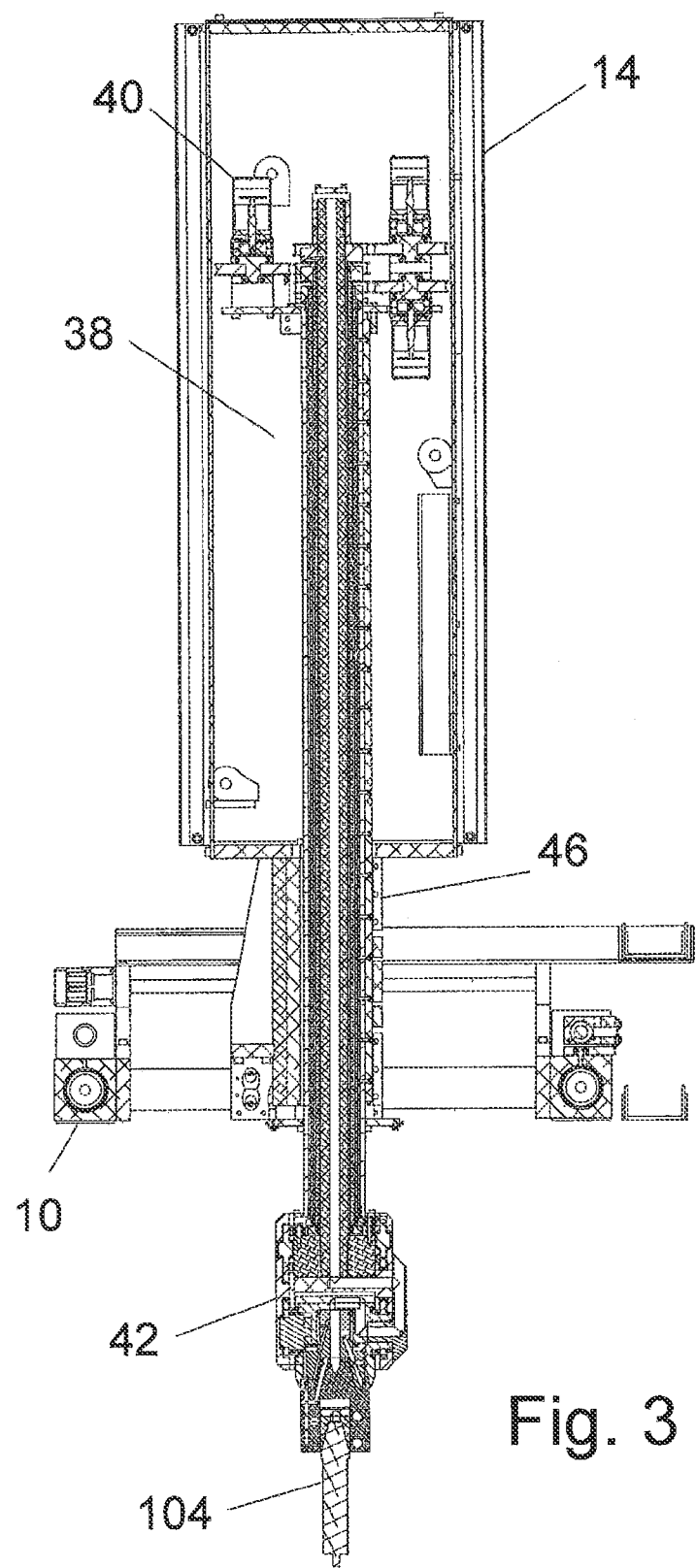
FIG. 3 is cross-sectional front view of a deburring system with a vertically translating mount.

Turning in detail to the drawings, an orthogonal mounting 10 defining two degrees of freedom in a horizontal plane of a machining system such as the deburring machine described in the Background of the Invention above and detailed here as the preferred embodiment supports a vertically translating mount 12. This mount 12 includes a mount housing 14 fixed to the orthogonal mount 10. The orthogonal mounting 10 and the vertically translating mount 12 are controlled in the three degrees of freedom by linear motion systems 16 such as a ball screw assembly, rack gear, or other linear motion system, controlled by a servo motor, or other positional control devices.

A top 18 for a deburring chamber is illustrated in FIG. 2. A rectangular opening to receive the deburring equipment is obscured by closure sheets 20, 22, 24, 26. These closure sheets are each mounted on a spring roller 28, 30, 32, 34, respectively, and drawn out under tension from the respective spring roller to engage a plate 36 fixed with the mount housing 14 at the rectangular opening in the top 18. Two of the spring rollers 28, 30 are mounted to the top 18. The other two spring rollers 32, 34 are slidably mounted to the move laterally toward and away from the first spring rollers 28, 30 to maintain a closure of the top 18.

Figure 4:
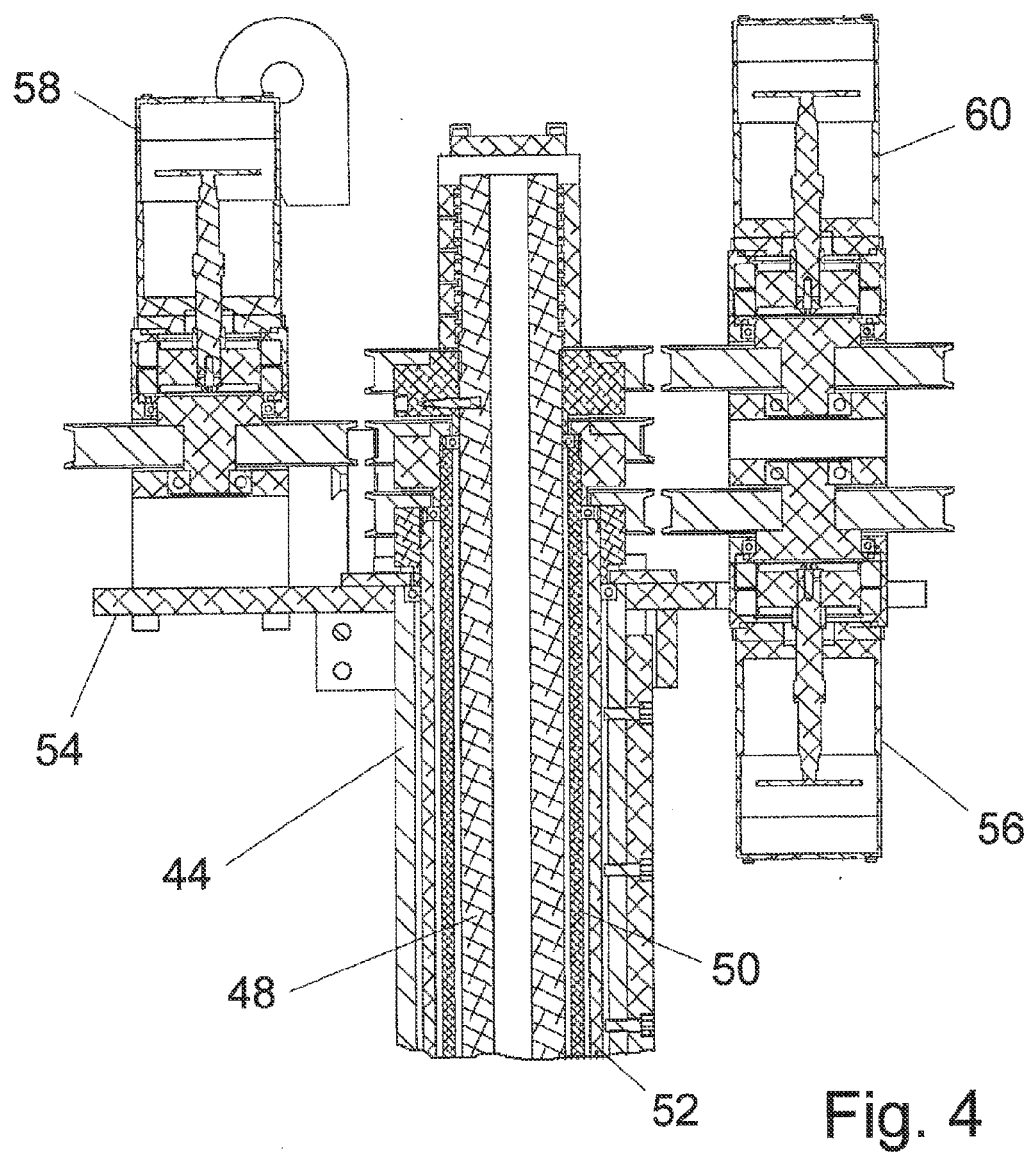
FIG. 4 is a cross-sectional front view detail of the drive system of the deburruing system of FIG. 3.
Figure 5:
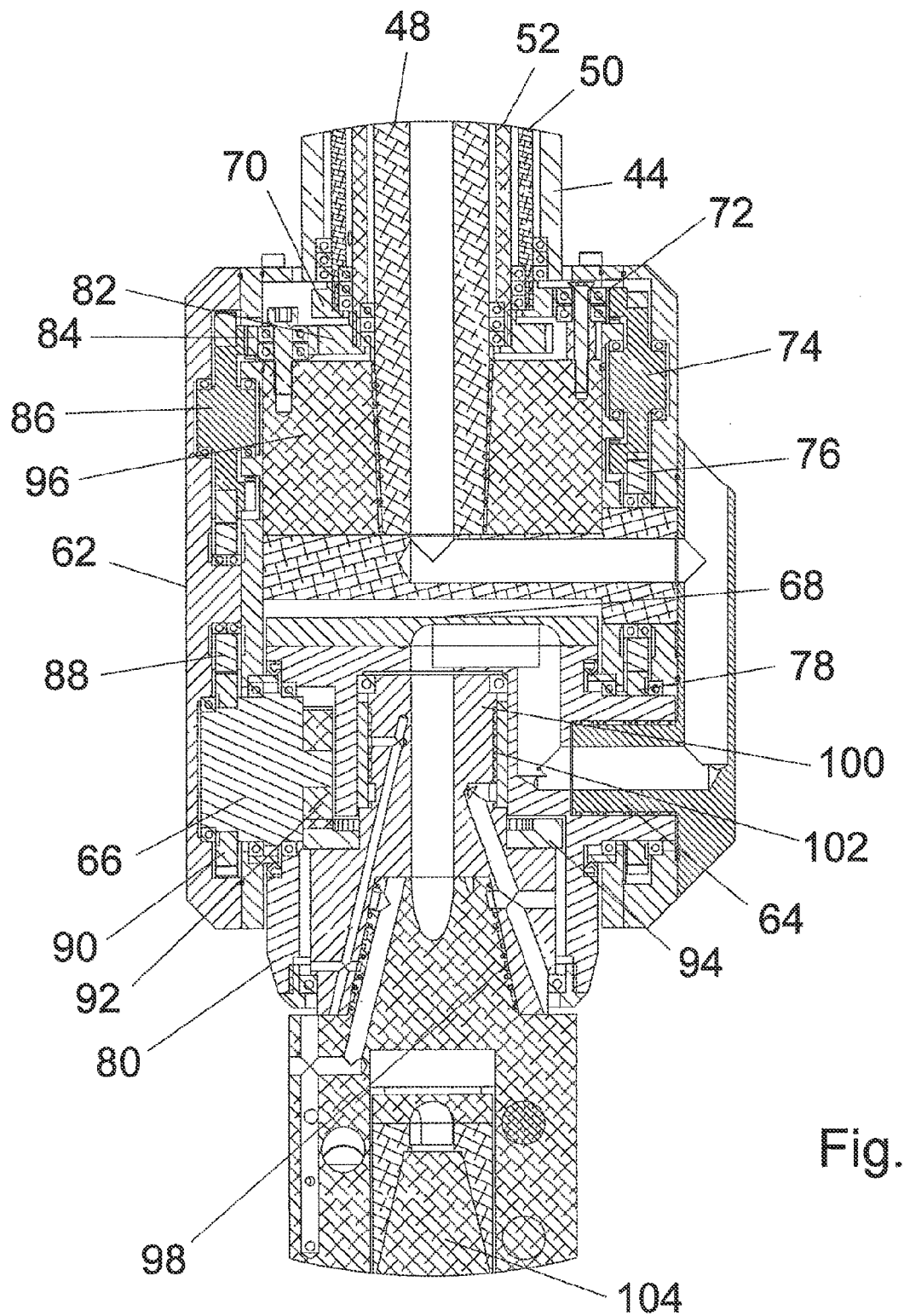
FIG. 5 is a cross-sectional detail view of the deburring head of the deburruing system of FIG. 3 taken through the housing assembly mounting axis.
Figure 6:
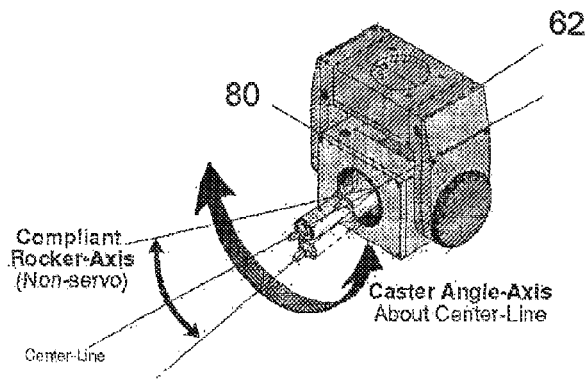
FIG. 6 is a perspective view of the tool mount housing assembly of the deburruing system of FIG. 3.
Figure 7:
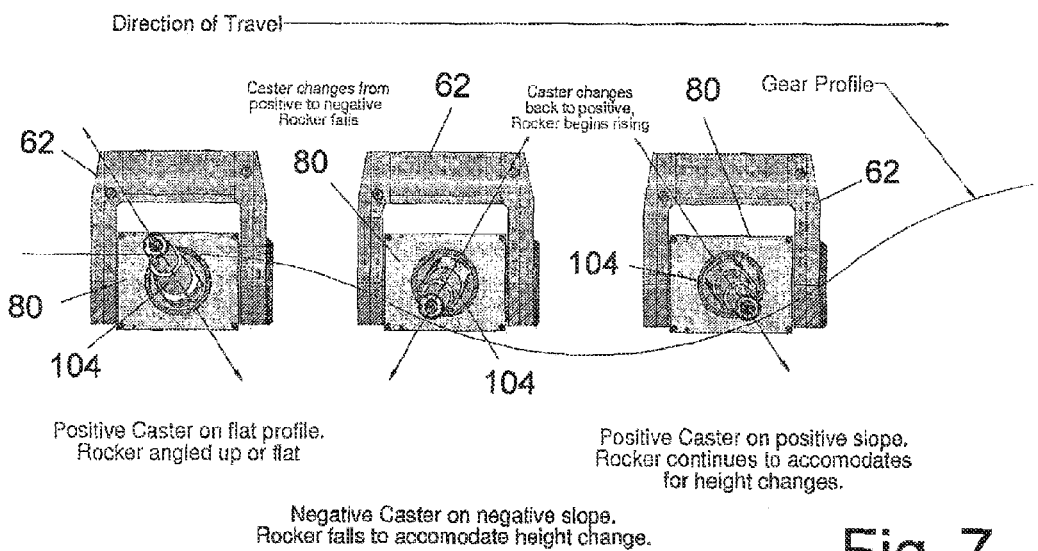
FIG. 7 is a schematic representation of caster angle of a tool relative to work profile.
Figure 8:
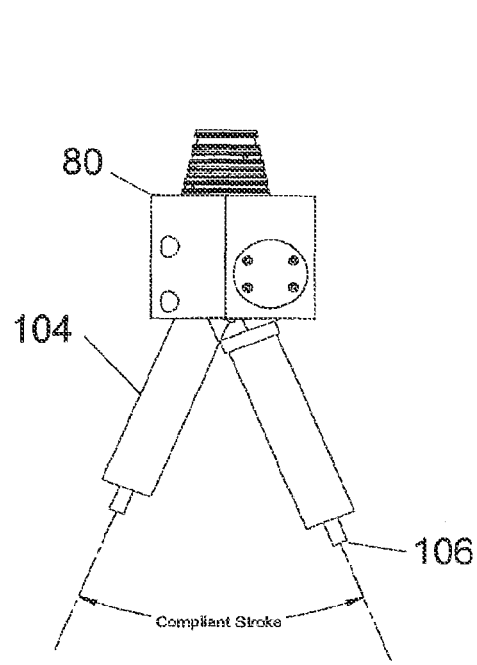
FIG. 8 is a side view showing range of motion of a tool.
Figure 9:
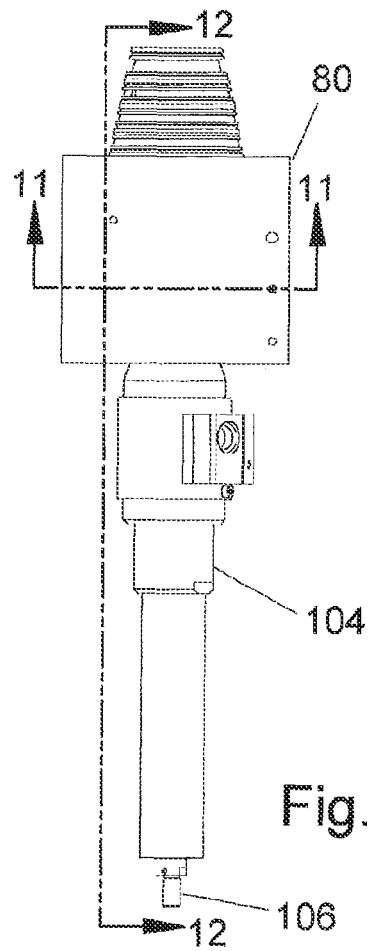
FIG. 9 is a front view of a tool.
Figure 10:
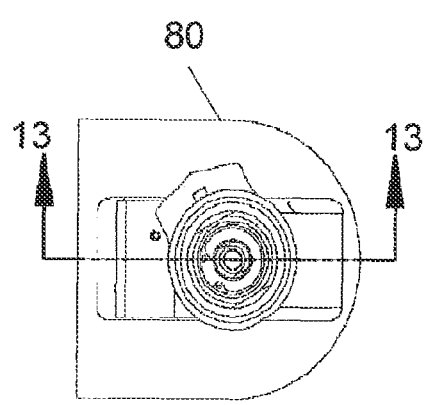
FIG. 10 is a top view of the tool.
Figure 11:
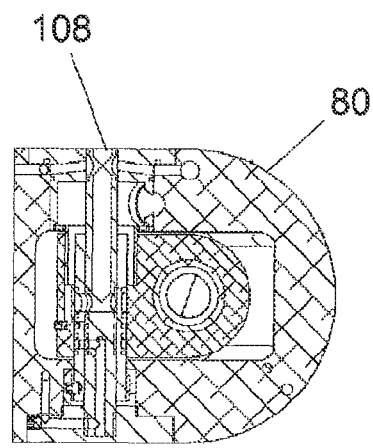
FIG. 11 is a cross section taken along line 11-11 of FIG. 9.
Figure 12:
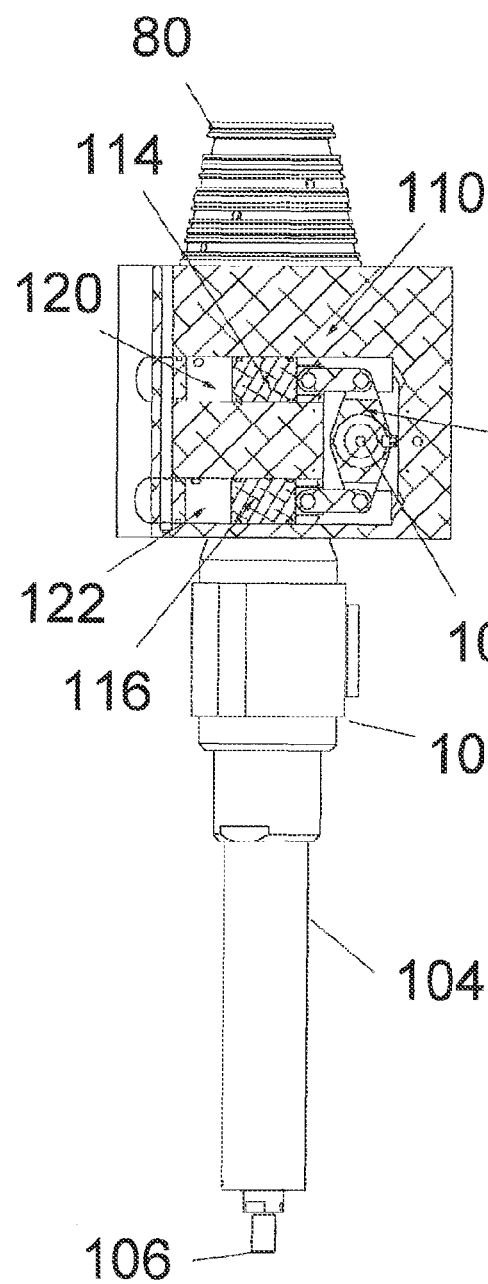
FIG. 12 is a cross section taken along line 1212 of FIG. 9.
Figure 13:
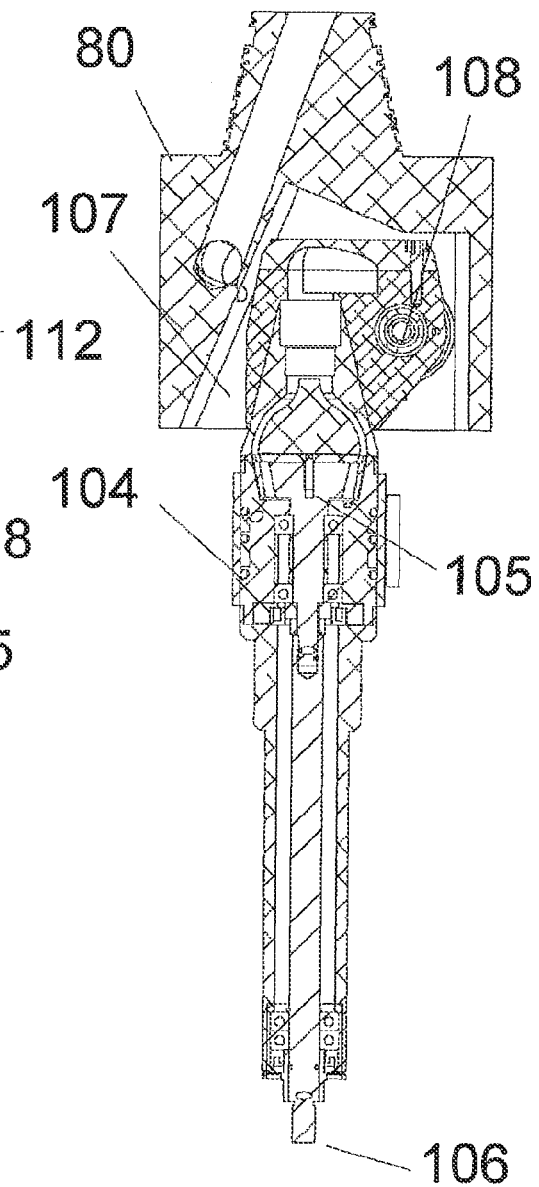
FIG. 13 is a cross section taken along line 13-13 of FIG. 10.

A deburring assembly 38, seen in FIG. 3, extends from inside the mount housing 14 where it is slidably mounted and driven vertically along its principal axis by a conventional linear motion system 16. The deburring assembly 38 includes a series of four concentrically arranged tubes with a drive system 40, seen in detail in FIG. 4, at the proximal end and a tool head, seen in FIG. 5, at the distal end. The tool head is illustrated as a deburring head 42 in the preferred embodiment. The outermost tube 44 is slidably mounted in a guide 46 and is vertically controlled by the linear motion system 16 controlling the third degree of freedom. The guide 46 is located between the mount housing 14 and the plate 36. The outermost tube 44 is constrained from rotating relative to the mount housing 14.

There are three rotatably mounted positioning tubes 48, 50, 52 arranged within the outermost tube 44. Each has bearings that allow individual and independent rotation. The drive system 40 at the top vertical end of the tube 44 includes a mounting plate 54 fixed to the outermost tube 44. The mounting plate 54 supports three motion controlled drive systems 56, 58, 60 that drive the positioning tubes 48, 50, 52, respectively. The positioning tubes 48, 50, 52 are rotatably driven by a gear set, chain, belt or another synchronized drive system controlled by a CNC machine or equivalent.

Looking then to the deburring head 42, the outermost tube 44 does not engage the deburring head 42. The innermost positioning tube 48 extends to engage a yoke assembly 62. The yoke assembly 62 can be rotated by the innermost positioning tube 48 without limit. The yoke assembly 62 includes an integral inwardly extending mounting pin 64. An opposed mounting pin 66 is free to rotate relative to the yoke assembly 62.

The outermost positioning tube 50 pivotally positions a housing assembly 68 about the mounting pin 64 and the opposed mounting pin 66. The housing assembly 68 is coupled with the positioning tube 50 through gearing or other drive train means. A first gear wheel 70 is fixed at the end of the positioning tube 50 and engages a pinion 72. The pinion 72 engages a crown gear 74, The crown gear 74 has a spur gear thereon which engages idler spur gear 76 which, in turn, engages a final spur gear 78 fixed to the housing assembly 68 about the axis defined by the pin 64 and the opposed mounting pin 66. This gear train is rotatably mounted in the yoke assembly 62. In this way, the housing assembly 68 can be driven in pitch motion for more than a total of 280° of arc symmetrical to the axis of the deburring assembly 38.

A collet assembly 80 is mounted inside the housing assembly 68. The collet assembly 80 can rotate with continuous rotations without limits in the housing assembly 68. In a similar arrangement to the drive for the housing assembly 68, the collet assembly 80 is engaged through a gear train with the middle positioning tube 52. The gear train includes a first gear wheel 82 fixed at the end of the middle positioning tube 52 and engages a pinion 84. The pinion 84 engages a crown gear 86. The crown gear 86 has a spur gear thereon which engages idler spur gear 88 which, in turn, engages a final spur gear 90 fixed to the opposed mounting pin 66. The opposed mounting pin 66 supports a further spur gear 92 fixed thereto which engages another crown gear 94 fixed to the collet assembly 80. This gear train is also rotatably mounted in the yoke assembly 62.

The positioning tube 48 has several individual holes thru its entire length that transmit fluids and gases through these holes from the upper end thereof, These holes are plugged at each end and other holes are drilled and staggered radially to intersect, the longitudinal holes to allow transfer, of the fluids, and gases. At the top of the positioning tube 48, there is rotary high pressure manifold that connect the passages in the positioning tube 48. The manifold allow fluid transfer, irrelevant to the positioning tube 48 rotating or being stopped. The manifold is mounted to the motion control plate 54. The yoke assembly 62 at the bottom routs these passages. The yoke 62 is made of arms and a center block 96. Through sealed passages in the yoke assembly 62, the fluids and gases are routed to the collet assembly 80. The fluids and gases are transferred to the collet assembly 80 by a dynamic seal joint.

Inside the collet assembly 80, there is a cone shaped tapered bore 98 with a latch system that receives various tools to be quickly removed and replaced using an optional automatic tool changing system. The tapered bore 98, in the collet assembly 80, has a series of seals that, when a tool assembly is inserted and latched into place, are properly sealed against fluid or gas leaks, yet the tools can be changed out without significant force or effort in a non precision manner. The tapered shape promotes self alignment and engagement. The unique tapered bore coupling with fluid transfer allow interchangeable tools to be driven or controlled by these fluids and gasses.

The collet assembly 80 includes a shaft 100 which is positioned and can rotate within a cavity 102 in the housing assembly 68. A fluid passageway through the yoke assembly 62 passes through the pin 64 to the housing assembly 68 and then through a rotary junction to the collet assembly 80. Other passageways can provide gas or liquid to the collet assembly 80. The cavity 102 has a lapped precision fit with the collet shaft 100 to control gas and liquid pressures from escaping in an uncontrolled manner. Holes are provided in the outer diameter of the collet shaft 100 to intersect the gas and liquid sources to allow the fluids to enter the cavity 102. Annular pressure and relief grooves supply pressurized fluid and vent any fluid leakage flowing axially of the collet shaft 100 back to a return passage.

A tool 104 is mounted to the collet assembly 80. The tool 104 is of the type including a hydraulic drive 105 to rotatably drive a machining implement on the shaft 106. The collet assembly 80 includes a central cavity 107 to mount the tool 104 about a pivot axis.

A shaft assembly 108 defines the pivot axis and includes a component fixed to the tool 104 to rock therewith. A pressure biased suspension 110 for the tool 104 provides a rocking of the tool 104. This degree of freedom is in a plane perpendicular to the axis defined by the pin 64 and the opposed mounting pin 66 of the yoke assembly 62. A crank 112 is mounted to the shaft assembly 108 to rock with the component also fixed to the tool 104. Two pistons 114, 116 are engaged with the ends of the crank 112 by pinned links 118 to slide in cylinders 120, 122.

Pressurized fluid is provided to the cylinders to control the position of the tool 104. Except for the rocking, the tool 104 follows a programmed path across the work. As the tool 104 moves away from the work in its programmed path, the tool 104 rocks toward the work, either by expansion of compressible fluid or a programmed supply to keep a constant pressure in the resisting cylinder 120, 122. As the tool 104 moves closer to the work in its programmed path, the tool 104 can back away from the work under the same fluid control.

The fluid used can be incompressible or compressible; but in this embodiment, compressible fluid is used. Compressible fluid provides a cushioning effect to the rocking position. As the plane through which the rocking is experienced is maintained by the yoke assembly 62, the pressure is maintained by the housing assembly 68 against the collet assembly 80. With pneumatic fluid, either the tool 104 receives pressure to one or the other cylinder 120, 122 and the tool 104 is pinned at one end or the other of its range of motion. Yet the fluid is compressible such that the tool 104 can flex with the work and a constant pressure can be provided by a constant pressure source. The two cylinders 120, 122 can also both be controlled to give interim rocking positions with control including a sensor to locate the tool 104. The constant pressure source can be set with a magnitude of pressure selected based on the type of tool, the type of worked material and the task to be performed. With hydraulic fluid, additional fluid is introduced or released to maintain constant pressure.

The employment of the rocker mechanism is further advantaged by the nominal orientation of the rotational axis of the collet assembly 80. If the yoke assembly 62 is oriented so that the rotary axis of the collet assembly 80 and the tool trails the relative motion of the deburring head 42 across the work, a caster effect of that orientation cooperates positively with the rocking adjustment if the contour of the work is falling away. If the contour of the work is moving toward the deburring head 42 as the head moves across the work, a nominal orientation of the rotational axis of the collet assembly 80 leading the relative motion of the deburring head 42 across the work provides a caster effect to cooperate positively with the rocking adjustment.

Control of the present system is reasonably uncomplicated. The normal operation of a CNC system or the like can be used for the tool head 42 to follow the nominal profile of the work. Misalignment of and anomalies in the work are accommodated for by the rocker mechanism. The constant fluid pressures can be predetermined through consideration of such factors as the type of tool, the type of worked material and the task to be performed. The CNC is further able to control the yoke assembly 62 to take a leading or trailing orientation to assist the rocking mechanism with caster as it has the data regarding the rising and falling of the work profile. Electrical sensors can also be employed as needed or convenient which are monitored by conductors through the fluid passages.

Thus, an improved drive system and tool head for automated machining processes such as deburring with an advantaged accommodation of work anomalies is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A machining system comprising
    a tool head including a yoke assembly, a housing assembly and a collet assembly, the yoke assembly being rotatably mounted about a yoke axis, the housing assembly being pivotally mounted to the yoke assembly about a housing axis perpendicular to the yoke axis, the collet assembly being rotatably mounted to the housing assembly about a collet axis perpendicular to the housing axis, the collet assembly including a cavity, a shaft assembly defining a pivotal axis thereacross and one or more piston and cylinder assemblies engaged with the shaft assembly to provide rocking of the shaft assembly relative to the cavity in a plane normal to the housing axis;
    a tool powered to rotate about a tool axis and fixed to the shaft assembly to rock therewith;
    at least one source of constant pressure fluid to pressurize the one or more piston and cylinder.

2. The machining system of claim 1, the at least one source of constant pressure fluid including a source of constant pressure gas.

3. The machining system of claim 2 further comprising work having a contour surface being machined, the tool head moving relative to the work in a first direction, the yoke axis being positioned with the collet axis trailing the tool head relative to the direction of relative movement of the tool head when the work contour is moving away from the tool head and the yoke axis being positioned with the collet axis leading the tool head relative to the direction of relative movement of the tool head when the work contour is moving toward the tool head.

4. The machining system of claim 1 further comprising work having a contour surface being machined, the tool head moving relative to the work in a first direction, the yoke axis being positioned with the collet axis trailing the tool head relative to the direction of relative movement of the tool head when the work contour is moving away from the tool head and the yoke axis being positioned with the collet axis leading the tool head relative to the direction of relative movement of the tool head when the work contour is moving toward the tool head.

* * * * *